US011979783B2

United States Patent
Khare et al.

(10) Patent No.: US 11,979,783 B2
(45) Date of Patent: May 7, 2024

(54) NETWORK DATA ANALYTICS FUNCTION PREDICTIVE HANDOVER

(71) Applicant: NOKIA TECHNOLOGIES OY, Espoo (FI)

(72) Inventors: Saurabh Khare, Bangalore (IN); Yannick Lair, Voisins le Bretonneux (FR); Shubhranshu Singh, Seeheim-Jugenheim (DE); Laurent Thiebaut, Antony (FR); Cinzia Sartori, Pullach (DE); Anja Jerichow, Grafing (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 261 days.

(21) Appl. No.: 17/399,399

(22) Filed: Aug. 11, 2021

(65) Prior Publication Data

US 2022/0053393 A1    Feb. 17, 2022

(51) Int. Cl.
*H04W 36/00* (2009.01)

(52) U.S. Cl.
CPC ... *H04W 36/0083* (2013.01); *H04W 36/0055* (2013.01)

(58) Field of Classification Search
CPC .............. H04W 36/0083; H04W 36/0055
See application file for complete search history.

(56) References Cited

U.S. PATENT DOCUMENTS

| 2010/0291924 | A1* | 11/2010 | Antrim | H04W 60/00 455/433 |
| --- | --- | --- | --- | --- |
| 2016/0306678 | A1 | 10/2016 | Hira et al. | |
| 2018/0192339 | A1* | 7/2018 | Mirra | H04W 36/0027 |
| 2019/0222489 | A1 | 7/2019 | Shan | |
| 2020/0112899 | A1 | 4/2020 | Annaiah et al. | |
| 2020/0288296 | A1* | 9/2020 | Fiorese | G06N 5/046 |
| 2021/0314906 | A1* | 10/2021 | Matolia | H04W 24/04 |
| 2023/0036465 | A1* | 2/2023 | Mattsson | H04W 60/04 |
| 2023/0077501 | A1* | 3/2023 | Raval | H04L 41/0895 709/224 |
| 2023/0090022 | A1* | 3/2023 | Han | H04L 41/5058 370/329 |
| 2023/0188424 | A1* | 6/2023 | Xin | H04L 41/342 709/223 |

(Continued)

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288 v16.4.0, (Jul. 2020), 66 pages.

(Continued)

*Primary Examiner* — Barry W Taylor
(74) *Attorney, Agent, or Firm* — ALSTON & BIRD LLP

(57) ABSTRACT

If a first condition for a handover of an analytics calculation for a user equipment by an analytics function is met, the analytics function requests, of at least one other analytics function of the communication network, preparation of the handover of the analytics calculation. If a second condition for the handover of the analytics calculation is met, the analytics function confirms the handover to one of the at least one other analytics function, the analytics calculation for the user equipment at the analytics function being deemed complete.

20 Claims, 10 Drawing Sheets

(56) References Cited

U.S. PATENT DOCUMENTS

| | | | |
|---|---|---|---|
| 2023/0209452 A1* | 6/2023 | Park | H04W 48/18 370/252 |
| 2023/0239680 A1* | 7/2023 | Park | H04L 41/14 370/329 |

OTHER PUBLICATIONS

"3rd Generation Partnership Project; Technical Specification Group Services and System Aspects; IP Multimedia Subsystem (IMS); Stage 2 (Release 16)", 3GPP TS 23.228 v 16.4.0, (Mar. 2020), 349 pages.

"3rd Generation Partnership Project; Technical Specification Group Services and System Aspects; Procedures for the 5G System (5GS); Stage 2 (Release 16)", 3GPP TS 23.502 v16.5.0, (Jul. 2020), 594 pages.

"3rd Generation Partnership Project; Technical Specification Group Services and System Aspects; Study of Enablers for Network Automation for 5G (Release 16)", 3GPP TR 23.791 v16.2.0, (Jun. 2019), 124 pages.

"3rd Generation Partnership Project; Technical Specification Group Services and System Aspects; Study on Enablers for Network Automation for the 5G System (5GS); Phase 2 (Release 17)", 3GPP TR 23.700-91 v0.4.0, (Jun. 2020), 186 pages.

Ericsson et al., "KI #2,11; New Sol: Solution on handling of distributed and mixed NWDAF deployments", 3GPP SA WG2 Meeting #139E, S2-2004527, (Jun. 1-12, 2020), 8 pages.

Ericsson, "Solution on How To Find an Associated NWDAF", 3GPP SA WG2 Meeting #136AH, S2-2000167, (Jan. 13-17, 2020), 4 pages.

Huawei et al., "Solution to Multiple NWDAF Instances", SA WG2 Meeting #136AH, S2-2000854, (Jan. 13-17, 2020), 4 pages.

International Search Report and Written Opinion for Patent Cooperation Treaty Application No. PCT/EP2020/072574 dated Feb. 17, 2021, 14 pages.

Oppo, "Two-Level Hierarchical NWDAF Architecture", 3GPP SA WG2 Meeting #139E, S2-2004528, (Jun. 1-12, 2020), 4 pages.

Samsung, "KI #2, New Sol: Supporting reselection of serving NWDAF", SA WG2 Meeting #139E, S2-2004148, (Jun. 1-12, 2020), 3 pages.

Office Action for Indian Application No. 202347015593 dated Sep. 19, 2023, 6 pages.

* cited by examiner

NETWORK DATA ANALYTICS FUNCTION PREDICTIVE HANDOVER

CROSS REFERENCE TO RELATED APPLICATIONS

This application claims priority to International Application No. PCT/EP2020/072574, filed Aug. 12, 2020, the entire contents of which are incorporated herein by reference.

TECHNICAL FIELD

At least some example embodiments relate to an apparatus, a method and a non-transitory computer-readable storage medium enabling network data analytics function predictive handover.

BACKGROUND

A network data analytics function (NWDAF) performs analytics calculation based on data collected from different data sources, such as AMF, SMF, PCF, UDM, AF, and OAM. It offers analytics calculation identified by a 3GPP defined analytics identifier to Consumers using services based architecture (SBA) defined for a 5G core network (5GC).

NWDAF functionalities include:
- Data collection based on subscription to events provided by AMF, SMF, PCF, UDM, AF (directly or via NEF), and OAM;
- Retrieval of information from data repositories (e.g. UDR via UDM for subscriber-related information);
- Retrieval of information about NFs (e.g. from NRF for NF-related information); and
- On-demand provision of analytics to consumers.

List of Abbreviations

3GPP Third Generation Partnership Project
5GC Fifth Generation Core Network
AF Application Function
AMF Access and Mobility Management Function
API Application Programming Interface
eNA enablers for Network Automation
NAS Non-Access Stratum
NEF Network Exposure Function
NF Network Function
NRF Network Repository Function
NWDAF Network Data Analytics Function
OAM Operation Administration and Maintenance
PCF Policy Control Function
SBA Service Based Architecture
SBI Service Based Interface
SMF Session Management Function
SUPI Subscription Permanent Identifier
TAI Tracking Area Identity
UDM Unified Data Management
UDR Unified Data Repository
UE User Equipment
URI Unified Resource Identifier

SUMMARY

The NWDAF collects data from different NFs where data may be collected over a period of time. In some scenarios, it is possible that within the time period of data collection and analytics calculation, NWDAF is required to handover its analytics calculation to other NWDAF or NWDAF is required to offload some of its analytics calculation to other NWDAF.

According to at least some example embodiments, a mechanism is provided to handover the context data and subscription information to another NWDAF (NWDAF handover). According to at least some example embodiments, a framework is provided for NWDAF handover.

According to at least some example embodiments, a mechanism is provided to predict and subscribe to potential NWDAF(s) e.g. based on UE mobility prediction. According to at least some example embodiments, this includes selecting and transferring any analytics context and analytics subscription data to more than one NWDAF, handing-over effectively the analytics to one of these NWDAF(s) and eventually canceling an analytics subscription to the other NWDAF (s).

According to at least some example embodiments, an apparatus, a method and a non-transitory computer-readable storage medium are provided as specified by the appended claims.

In the following example embodiments will be described with reference to the accompanying drawings.

DESCRIPTION OF THE EMBODIMENTS

In the following, example embodiments will be described with reference to the accompanying drawings.

In the following description and features embodiments and examples are described with reference to the NWDAF for the sake of simplicity. It is clear however that the principles described in this disclosure might be also implemented by any other network function having the capability of performing data analytics. In particular, the NWDAF may be implemented in or may be an apparatus for performing an analytics function.

Figure 1:
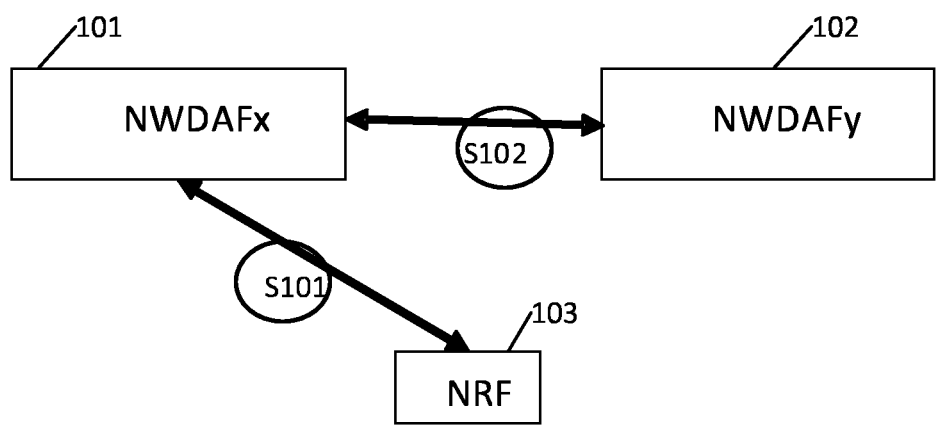
FIG. 1 shows a schematic diagram illustrating a process of selecting another NWDAF, which is adopted according to at least some example embodiments.

FIG. 1 shows a schematic diagram illustrating a process of selecting another NWDAF, which is adopted according to at least some example embodiments.

In general, NWDAF can select a new NWDAF via NRF discovery procedure. It is applicable when the first NWDAF has enough information about another NWDAF to discover via NRF.

As shown in FIG. 1, NWDAFx 101 wants to handover to another NWDAF, e.g. NWDAFy 102. Therefore, NWDAFx 101 discovers the other NWDAF, NWDAFy 102, supporting required analytics and serving area, using NRF 103 (Step 101). In step S102, NWDAF 101 performs a handover to NWDAFy 102.

Figure 2:
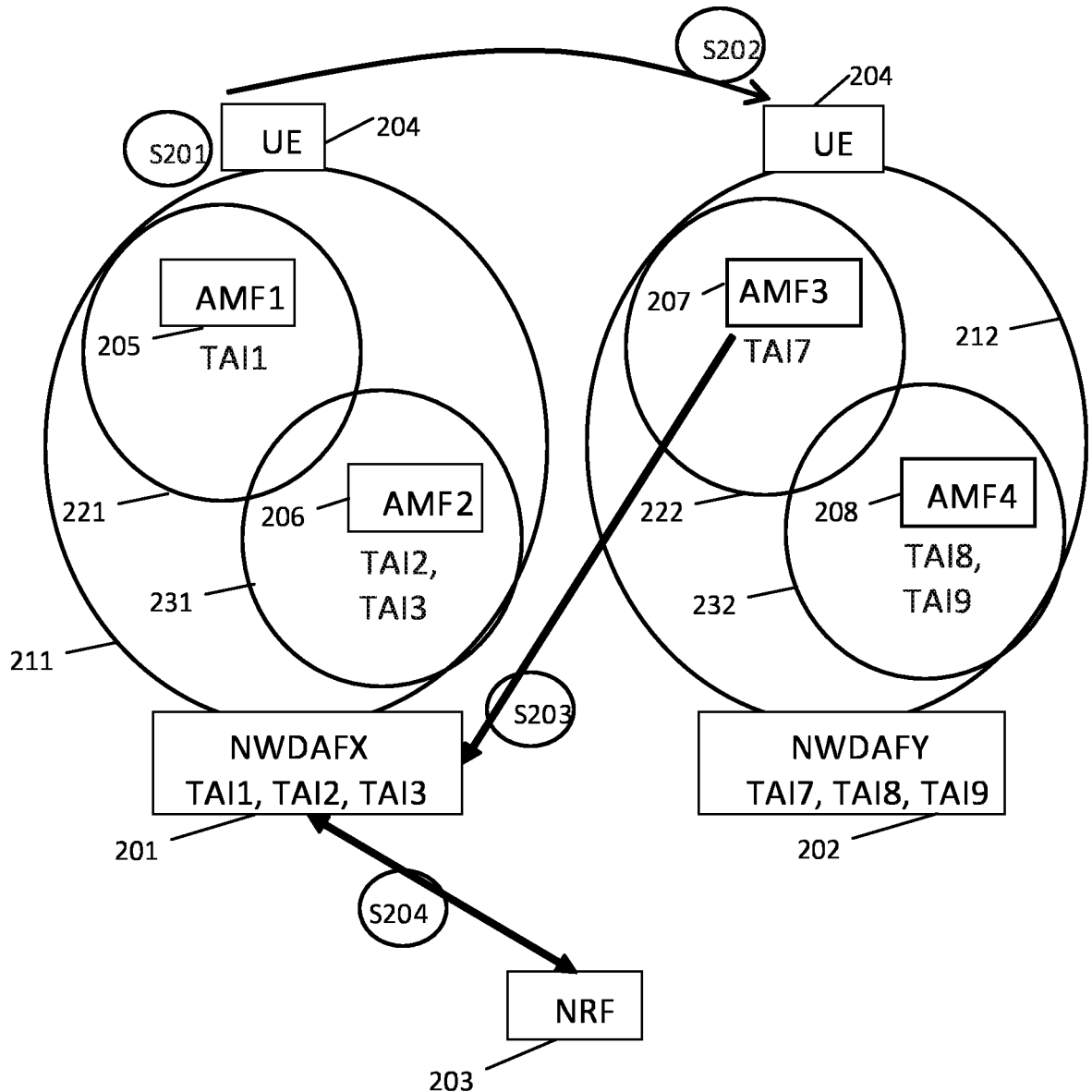
FIG. 2 shows a schematic diagram illustrating another process of selecting another NWDAF, which is adopted according to at least some example embodiments.

FIG. 2 shows a schematic diagram illustrating another process of selecting another NWDAF, which is adopted according to at least some example embodiments.

In particular, FIG. 2 illustrates NWDAF selection after a UE moved out of an area of interest.

As shown in FIG. 2, UE 204 is attached to AMF1 205 (TAI1 (area 221)) (step S201). NWDAFx 201 supports TAI1 (area 221) supported by AMF1 205 and TAI2 (area 231) and TAI3 (area 231) supported by AMF2 206. NWDAFx 201 is performing a UE 204 specific analytics. Therefore, NWDAFx 201 has done a subscription into AMF1 201 for an 'Area of Interest TAI List'. Whenever the UE 204 is moving to AMF3 207 (step S202), as NWDAFx 201 has subscribed for information of UE 204 moving out of an area of interest 211 made up of TAI1+TAI2+TAI3, the AMF3 207 sends a notification to NWDAFx 201 stating the change of the location and current TAI (TAI 7 (area 222)) (step S203).

In case NWDAFx 201 receives a new TAI (TAI7) which is not served by NWDAFx 201, NWDAFx 201 performs the discovery of new NWDAF supporting TAI7 and NRF 203 provides the target NWDAF details (step S204).

AMF3 207 is supported by NWDAFy 202, which supports an area of interest 212 of TAI7 (area 222) supported by AMF3 207 and TAI8 (area 232) and TAI9 (area 232) supported by AMF4 208.

As mentioned beforehand, an NWDAF collects data from different NFs via Subscribe/Notify API/framework where data may be collected over a period of time. In some scenarios, it is possible that within the time period of data collection and analytics, the NWDAF is required to handover its analytics to another NWDAF or the NWDAF is required to offload some of its analytics to another NWDAF. These scenarios are explained below, referring to FIG. 3.

Figure 3:
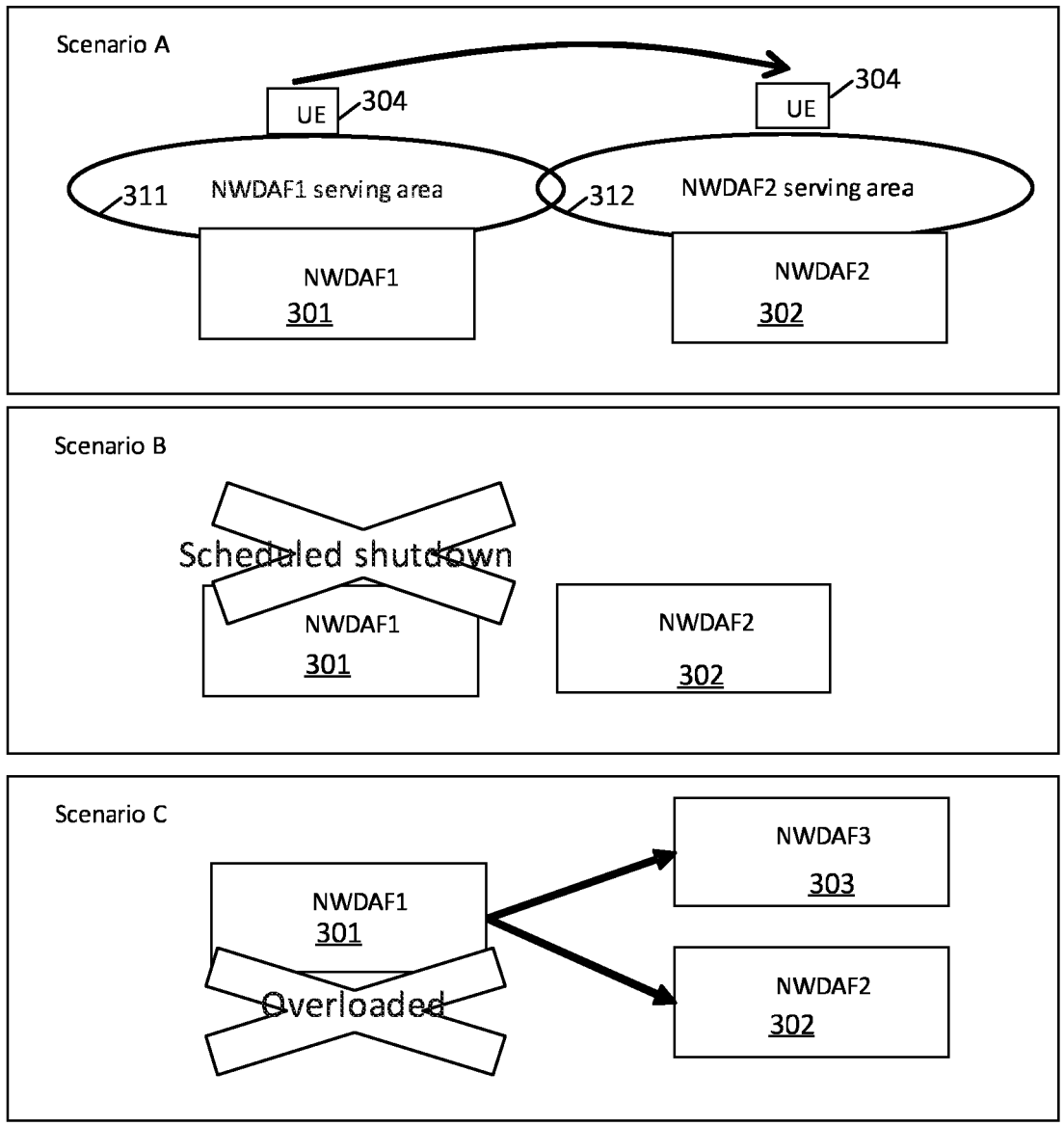
FIG. 3 shows schematic diagrams illustrating scenarios A, B and C requiring handover to another NWDAF.

In scenario A shown in FIG. 3, NWDAF1 301 is serving for an area 311 (set of TAIs, e.g. TAI-1) where UE 304 is attached, whereas NWDAF2 302 is serving for another service area 312 (other sets of TAIs, e.g. TAI-2). As long as UE 304 is located within TAI-1 UE 304 specific analytics is performed by NWDAF1 301. At some point, UE 304 moves to TAI-2 which is served by NWDAF2 302. In this case, NWDAF2 302 needs to start collecting data and providing UE 304 specific data and analytics, and also NWDAF2 302 has to take over control of the analytics from NWDAF1 301.

In scenario B shown in FIG. 3, NWDAF1 301 is shutting down according to a schedule, then another NWDAF (e.g. NWDAF2 302) has to take over existing task/analytics performed by NWDAF1 301.

In scenario C shown in FIG. 3, NWDAF1 301 is overloaded and wants to offload some analytics to other NWDAF(s) (e.g. NWDAF2 302, NWDAF3, 303).

All of the above scenarios cause below requirements on NWDAF:

To handover context data and subscription information to other NWDAF (NWDAF handover). According to at least some example embodiments described below, a framework for NWDAF handover is provided.

To predict and subscribe to potential NWDAF(s) e.g. based on UE mobility prediction. For example, selecting and possibly transferring any context and subscription data to more than one NWDAF is required, and eventually canceling a subscription to the other NWDAF(s) is required.

According to at least some example embodiments, an NWDAF is enabled to predict and provide information on the analytics about a UE to one or more potential NWDAF(s) which can take-over and continue to provide data collection and analytics services in an UE's new location. According to at least some example embodiments, an NWDAF is enabled to cancel analytics about a UE to the other NWDAF, e.g. if wrongly predicted and subscribed to.

According to at least some example embodiments, an overall procedure and relevant details are provided, to enable NWDAF to handover context, subscription information along with any analytics data to another NWDAF.

In the following, in part 1, NWDAF selection for handover (Predictive handover—preparation and execution) according to at least some example embodiment will be described. In part 2, Context and Subscription transfer procedures according to at least some example embodiments will be described.

Part 1: Predictive Handover (Handover Preparation and Handover Execution)

Scenario a (UE is Moving to Another Area)

Figure 4:
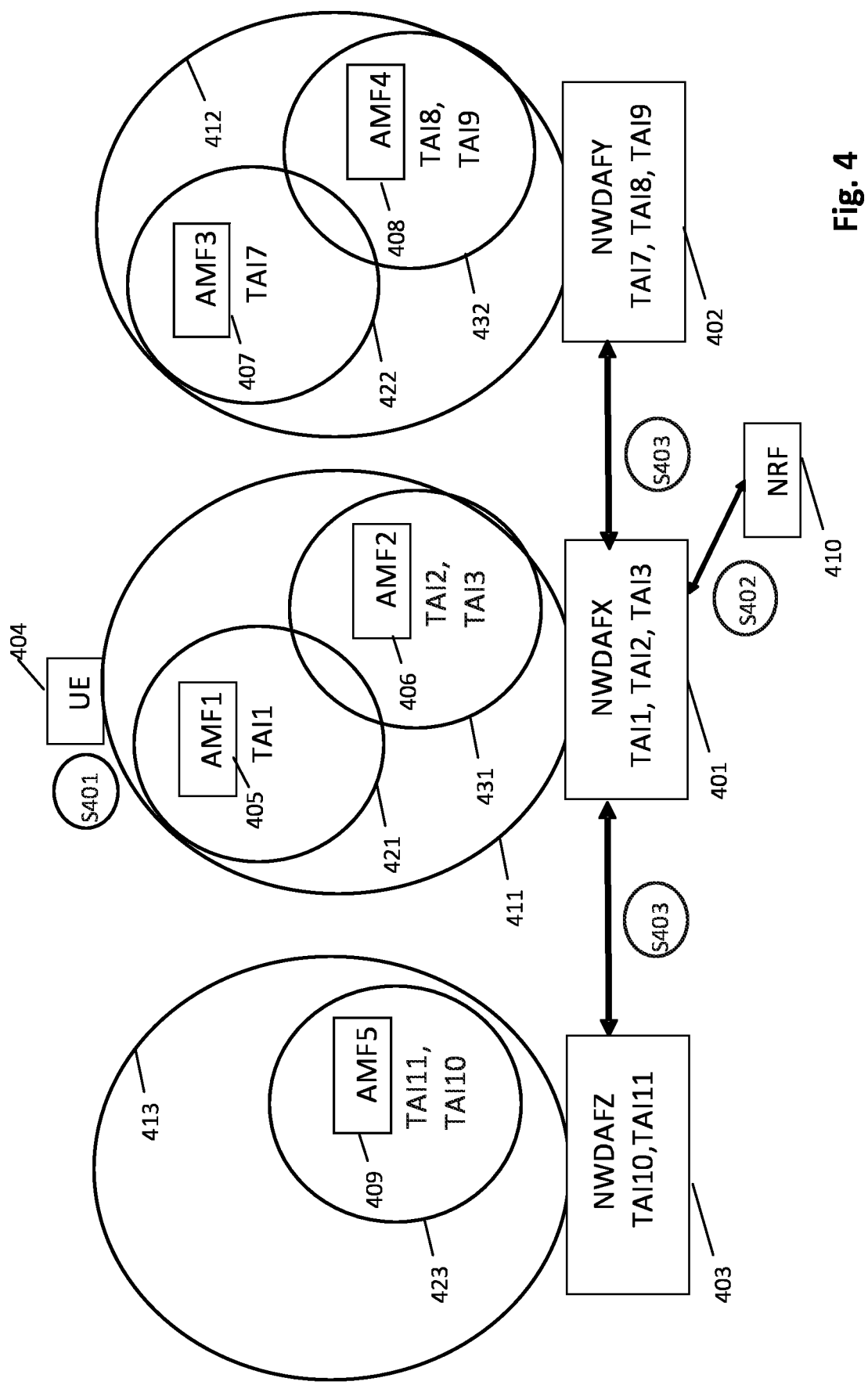
FIG. 4 shows a schematic diagram illustrating NWDAF selection for handover in scenario A according to at least some example embodiments.

FIG. 4 shows a schematic diagram illustrating NWDAF selection for handover in scenario A according to at least some example embodiments.

In step S401 of FIG. 4, NWDAFx 401 performs UE 404 mobility analytics calculation and finds out that UE 404 may move out of an NWDAFx 401 serving area 411 at a certain time.

The NWDAFx 401 serving area 411 comprises an area 421 of TAI1 supported by AMF1 405, and an area 431 of TAI2 and TAI3 supported by AMF2 406.

In step S402, NWDAFx 401 discovers NWDAFy 402 and NWDAFz 403 serving those probable TAIs where UE 404 can move into, using NRF 410.

For example, NWDAFy 402 serves an area 412 which comprises an area 422 of TAI7 supported by AMF3 407, and an area 432 of TAI8 and TAI9 supported by AMF4 408.

For example, NWDAFz 403 serves an area 413 which comprises an area 423 of TAI10 and TAI11 supported by AMF5 409.

In step S403, NWDAFx 401 sends a handover prepare request to both NWDAFy 402 and NWDAFz 403 indicating that a UE may attach in their area 412, 413, and requests these NWDAFs 402, 403 to be ready for handover.

For example, the handover prepare request is a new SBI message containing all the details of the analytics calculation and subscription.

Alternatively, the handover prepare request is realized by Nnwdaf_AnalyticsSubscription_Subscribe with additional flags and additional information. An additional flag "SubscriptionType=Predictive" indicates that this is a handover preparation request. A handover confirmation will follow later. "SubscriptionType=Predictive" represents an example implementation of an indication of handover of the analytics calculation according to at least some example embodiments, which indicates that the handover requested of NWDAFy 402 and NWDAFz 403 is a predictive handover.

According to at least some example embodiments, the additional information comprises at least one of:
an indication of presence of historical data,
historical data,
an indication of presence of analytics output data, and
analytics output data.

When NWDAFy 402 and NWDAFz 403 receive a handover prepare request, these NWDAFs 402, 403 start preparing themselves for handover. For example, the NWDAFs 402, 403 subscribe to different NFs (AF, OAM, AMFs, etc.) specific to UE 404 based on information received from NWDAFx 401. For example, the NWDAFs 402, 403 start collecting historical data stored in a center Data Base (DB)/Data lake, which will be described later on.

When UE 404 attaches to AMF3 407 and the AMF3 407 notifies NWDAFx 401 about the location as described above with respect to FIG. 2, the NWDAFx 401 sends a handover confirmation to NWDAFy 402 and cancels the handover request to NWDAFz 403, which will be described in more detail with reference to FIG. 5.

For example, for handover confirmation, NWDAFx 401 sends a handover confirmation message to NWDAFy 402, or alternatively a Nnwdaf_AnalyticsSubscription_SusbcriptionModify request to NWDAFy 402 to update with "SubscriptionType=Confirmed".

"SubscriptionType=Confirmed" represents an example implementation of an indication of handover of the analytics calculation according to at least some example embodiments, which indicates that the handover requested of NWDAFy 402 is a confirmed handover.

For example, for handover cancelation, NWDAFx 401 sends a handover cancellation message to NWDAFz 403, or alternatively a Nnwdaf_AnalyticsSubscription_Unsubscribe request to NWDAFz 403 to remove the subscription.

As described above, according to at least some embodiments, handover preparation, confirmation, and cancelation is realized by a new SBI message.

Alternatively, according to at least some embodiments, handover preparation, confirmation, and cancelation is realized by a new NWDAF service.

Alternatively, according to at least some embodiments, handover preparation, confirmation, and cancelation is realized by a modification of existing NWDAF services.

Figure 5:
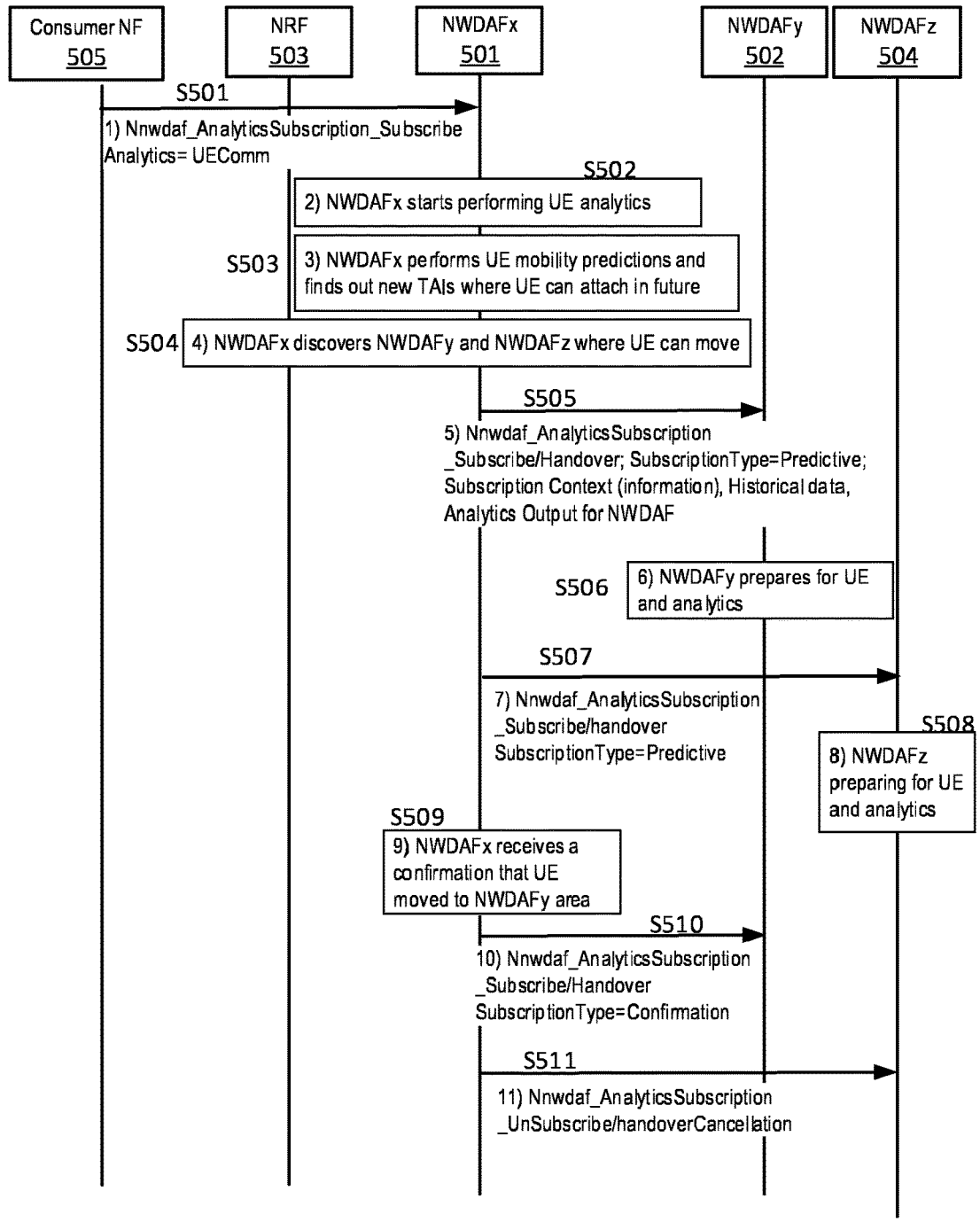
FIG. 5 shows a signaling diagram illustrating NWDAF selection for handover in scenario A according to at least some example embodiments.

FIG. 5 shows a signaling diagram illustrating NWDAF selection for handover in scenario A according to at least some example embodiments.

In step S501, a consumer NF 505 subscribes using Nnwdaf_AnalyticsSubscription_Subscribe message to NWDAFx 501 for certain analytics calculation e.g. UE mobility or UE communication.

In step S502, NWDAFx 501 performs requested analytics calculation and provides requested information to consumer NF 505.

In step S503, as a pre-requirement to potential handover, NWDAFx 501 periodically performs UE mobility prediction to find out new TAIs where the UE can attach in future.

In step S504, if in step S503, NWDAFx 501 detects a first condition for a handover of the analytics calculation for the UE, e.g. the NWDAFx 501 predicts that the UE, at a certain time, will likely move to a new TAI (or TAIs), then it sends a discovery request to NRF 503 requesting NWDAF (or multiple NWDAFs) that are serving those TAI(s). NRF 503 in response provides NWDAFy 502 and NWDAFz 504 information, e.g. NWDAFy 502 and NWDAFz 504 are serving those predicted TAI(s).

In step S505, NWDAFx 501 requests of NWDAFy 502 preparation of the handover of the analytics calculation by subscribing using Nnwdaf_AnalyticsSubscription_Subscribe to NWDAFy 502, and in order to inform NWDAFy 502 that this subscription is specific for a potential handover, it indicates "SubscriptionType=Predictive" indicating that this is a handover preparation request for an ongoing data analytics calculation for a certain consumer NF 505. As described above, "SubscriptionType=Predictive" represents an example implementation of an indication of handover of the analytics calculation according to at least some example embodiments, which indicates that the handover requested of NWDAFy 502 is a predictive handover.

For example, Nnwdaf_AnalyticsSubscription_Subscribe further includes subscription context (information) (which is also referred to as "analytics subscription data"), historical data and analytics output (which is also referred to as "analytics output data") for NWDAF, which will be described in more detail later on. NWDAFx 501 continues performing the analytics calculation for the UE.

In step S506, on successfully receiving Nnwdaf_AnalyticsSubscription_Subscribe in step S505, NWDAFy 502 starts preparing for data collection and analytics calculation, for example by already subscribing to those NFs relevant to the particular consumer NF 505 analytics request.

In step S507, NWDAFx 501 requests of NWDAFz 504 preparation of the handover of the analytics calculation by subscribing using Nnwdaf_AnalyticsSubscription_Subscribe to NWDAFz 504, and in order to inform NWDAFz 504 that this subscription is specific for a potential handover, it indicates "SubscriptionType=Predictive" indicating that this is a handover preparation request for an ongoing data analytics calculation for a certain consumer NF 505. As described above, "SubscriptionType=Predictive" represents an example implementation of an indication of handover of the analytics calculation according to at least some example embodiments, which indicates that the handover requested of NWDAFz 504 is a predictive handover.

For example, Nnwdaf_AnalyticsSubscription_Subscribe further includes subscription context (information), historical data and analytics output for NWDAF, which will be described in more detail later on. NWDAFx 501 continues performing the analytics calculation for the UE.

In step S508, on successfully receiving Nnwdaf_AnalyticsSubscription_Subscribe in step S507, NWDAFz 504 starts preparing for data collection and analytics calculation, for example by already subscribing to those NFs relevant to the particular consumer NF 505 analytics request.

In step S509, based on actual UE mobility NWDAFx 501 (e.g. corresponding to NWDAFx 401 of FIG. 4) receives, e.g., from AMF3 407 as illustrated in FIG. 4, a notification that UE 404 has moved to TAI7. NWDAFx 501 already knows from NRF 503 (corresponding to NRF 410 of FIG. 4) and had also subscribed to NWDAFy 502 (corresponding to NWDAFy 402 of FIG. 4) which is serving this TAI7. In other words, in step S509 detects a second condition for the handover of the analytics calculation.

In step S510, upon detecting the second condition for the handover of the analytics calculation, NWDAFx 501 confirms handover to NWDAFy 502 by sending Nnwdaf_AnalyticsSubscription_SusbcriptionModify request to NWDAFy 502 with "SubscriptionType=Confirmed". On receipt of this confirmation, NWDAFy 502 starts data analysis and prediction to provide requested analytics calculation to consumer NF 505. As described above, "SubscriptionType=Confirmed" represents an example implementation of an indication of handover of the analytics calculation according to at least some example embodiments, which indicates that the handover requested of NWDAFy 502 is a confirmed handover.

NWDAFx 501 considers the analytics calculation for the UE complete, e.g. after receiving a confirmation that the handover to NWDAFy 502 has been successful. According to at least some example embodiments, in case NWDAFx 501 considers the analytics calculation for the UE complete, it stops the analytics calculation.

In step S511, NWDAFx 501 cancels the previously subscribed handover request to NWDAFz 504 by sending Nnwdaf_AnalyticsSubscription_Unsubscribe request message to NWDAFz 504.

Scenarios B and C (Scheduled Shutdown or Overload Scenario)

In the case of scenarios B and C illustrated in FIG. 3, NWDAFx/NWDAF1 is aware about which other NWDAF (NWDAFy/NWDAF2, NWDAFz/NWDAF3) should be used for handover. Here NWDAFx/NWDAF1 takes a decision when to initiate a handover prepare message, e.g. to give sufficient time to the other NWDAF, and when to send a handover confirmation.

Figure 6:
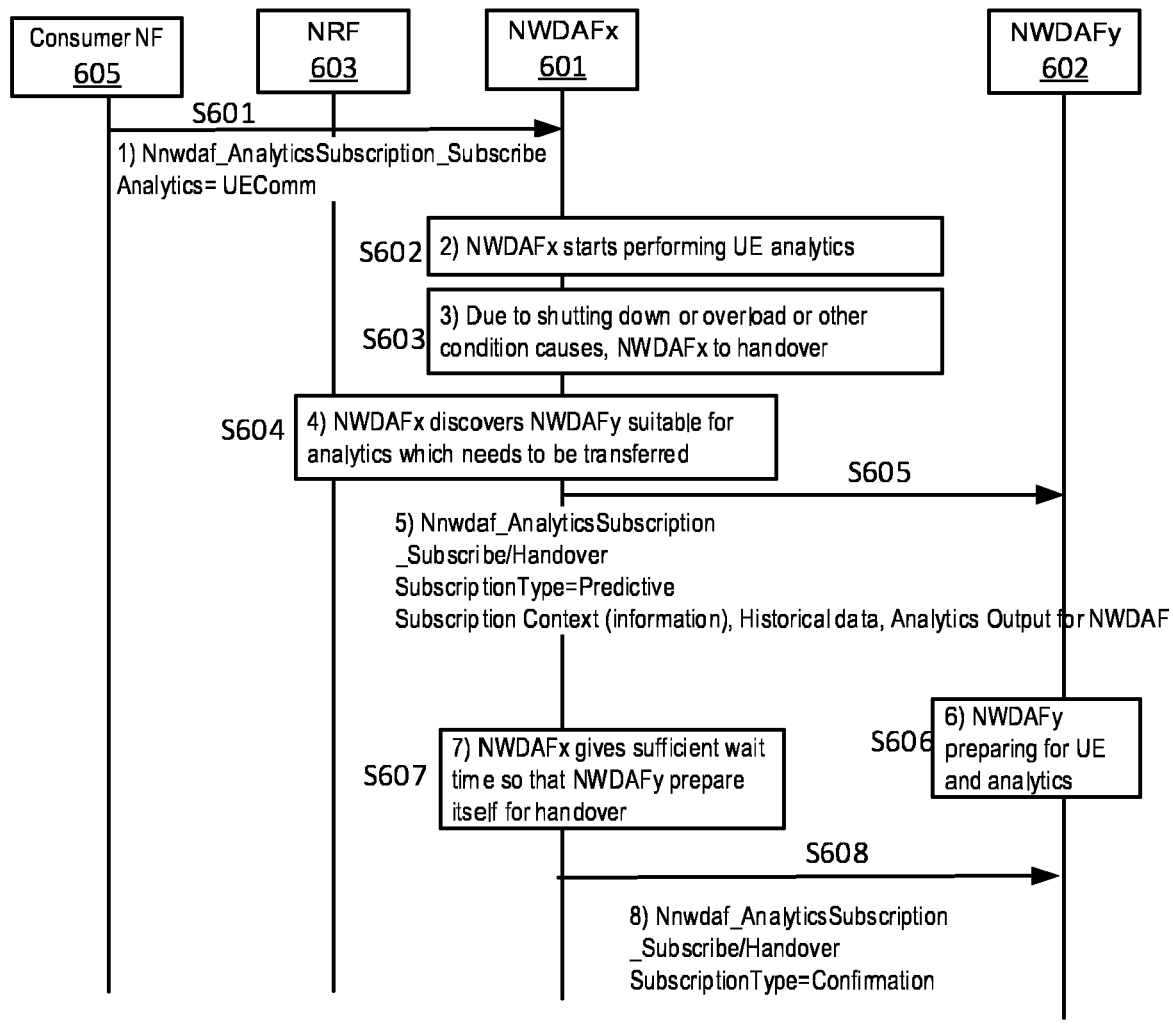
FIG. 6 shows a signaling diagram illustrating NWDAF selection for handover in scenarios B and C according to at least some example embodiments.

FIG. 6 shows a signaling diagram illustrating NWDAF selection for handover in scenarios B and C according to at least some example embodiments.

In step S601, a consumer NF 605 subscribes using Nnwdaf_AnalyticsSubscription_Subscribe message to NWDAFx 601 for certain analytics calculation, e.g. UE mobility or UE communication.

In step S602, NWDAFx 601 performs requested analytics calculation and provides requested information to consumer NF 605.

In step S603, NWDAFx 601 detects that a handover will become necessary due to a scheduled shut down or a predicted of start of overload or other condition causes. In other words, the NWDAFx 601 detects a first condition for handover of the analytics calculation.

In step S604, NWDAFx 601 discovers a suitable NWDAF that can serve consumer NF 605 request received in step S601 by NWDAFx 601. In this case, there is no need to predict UE mobility.

In step S605, NWDAFx 601 subscribes using Nnwdaf_AnalyticsSubscription_Subscribe to NWDAFy 602, and in order to inform NWDAFy 602 that this subscription is specific for a potential handover, it indicates "SubscriptionType=Predictive" indicating that this is a handover preparation request for an ongoing data analytics calculation for the consumer NF 605. As described above, "SubscriptionType=Predictive" represents an example implementation of an indication of handover of the analytics calculation according to at least some example embodiments, which indicates that the handover requested of NWDAFy 602 is a predictive handover.

For example, Nnwdaf_AnalyticsSubscription_Subscribe further includes subscription context (information), historical data and analytics output for NWDAF, which will be described in more detail later on.

NWDAFx 601 continues performing the analytics calculation for the UE.

In step S606, on successfully receiving Nnwdaf_AnalyticsSubscription_Subscribe in step S605, NWDAFy 602 starts preparing for data collection and analytics calculation, for example by already subscribing to those NFs relevant to the particular consumer NF 605 analytics request.

In step S607, the NWDAFx 601 gives sufficient waiting time so that NWDAFy 602 can prepare itself for handover. In step S608, upon detecting a second condition for the handover of the analytics calculation, e.g. after a random waiting time or after receiving a confirmation message from NWDAFy 602 in response to the NWDAFx 601 request sent in step S605, NWDAFx 601 sends a confirmation message to NWDAFy 602 by sending Nnwdaf_AnalyticsSubscription_Susbcription request with "SubscriptionType=Confirmed". As described above, "SubscriptionType=Confirmed" represents an example implementation of an indication of handover of the analytics calculation according to at least some example embodiments, which indicates that the handover requested of NWDAFy 602 is a confirmed handover. Thereafter, in case of scenario B, considering the analytics calculation for the UE complete, NWDAFx 601 prepares for the shutdown, e.g. stopping performing the analytics calculation for the UE.

Part 2: Context and Subscription Information Transfer

Once another NWDAF is selected as defined above in part 1, then data needs to be transferred to the selected NWDAF. For example, three types of data have to be transferred between NWDAFs. According to at least some example embodiments, this data is transferred via a dedicated Nnwdaf_Handover service. Alternatively, according to at least some example embodiments, this data is transferred via any other Nnwdaf service. According to an example implementation, this data is transferred via Nnwdaf_AnalyticsSusbcription_Susbcribe. Alternatively, according to an example implementation, this data is transferred via Nnwdaf_AnalyticsSusbcription_Handover API.

According to at least some example embodiments, to the selected NWDAF information which relates to the analytics calculation are transferred, which comprises at least one of an indication of handover of the analytics calculation, analytics subscription data, an indication of presence of historical data, historical data, an indication of presence of analytics output data, and analytics output data.

For example, the indication of handover of the analytics calculation indicates whether the handover requested of the at least one other analytics function is a predictive handover or a confirmed handover.

For example, the historical data comprises at least one of an identifier of a storage location of the historical data and the historical data itself, and the analytics output data comprises at least one of an identifier of a storage location of the analytics output data and the analytics output data itself.

Table 1 illustrates three types of data according to at least some example embodiments.

TABLE 1

| S.No | Data type | Data includes |
|---|---|---|
| 1 | Subscription Context (information) | Callback URI of consumer NF which created subscription at NWDAFx Analytics Id and corresponding details (expiry, SUPI, analytics specific information) |
| 2 | Historical data | Information for Historical data availability Events collected by NWDAF or input received from different NFs NF subscribed (NF address), Time window |
| 3 | Analytics Output for NWDAF | Information for Analytics Output availability Well defined metadata which is prepared by first NWDAF based on input received until a current time. It will have Confidence level |

TABLE 1-continued

| S.No | Data type | Data includes |
|---|---|---|
| | | Number of Input analyzed per NF (coupled with confidence level) Prediction result etc.. |

For example, when NWDAFx (e.g. NWDAFx 501 of FIG. 5 or NWDAFx 601 of FIG. 6) invokes an API Nnwdaf_AnalyticsSubscription_Subscribe or Nnwdaf_AnalyticsSubscription_Handover request provided by NWDAFy (e.g. NWDAFy 502, NWDAFz 504 of FIG. 5 or NWDAFy 602 of FIG. 6), then NWDAFx adds parameters in the API to indicate at least one of the following:

It is a predictive or confirmed Subscription (as defined in the handover preparation phase).
URI for historical data stored in NWDAFx or external Data Base.
Analytics output availability indication.

1. Subscription Data Transfer

According to at least some example embodiments, data "subscription context (information)", also referred to here as "subscription data" or "analytics subscription data" is transferred in a handover request where source NWDAF sends a handover request to another NWDAF to transfer the subscription data.

The subscription data comprises at least one of a callback URI of a consumer network function which created subscription at the analytics function, and an analytics Id and corresponding details comprising at least one of expiry, subscription permanent identifier and analytics specific information.

2. Historical Data Transfer

According to at least some example embodiments, the historical data comprises at least one of an identifier of a storage location of the historical data and the historical data itself.

For example, the historical data comprises at least one of the following information:

events collected by the analytics function;
input data received by the analytics function from network functions of the communication network;
addresses of the network functions; and
a time window over which each event collected by the analytics function has been collected.

Figure 7:
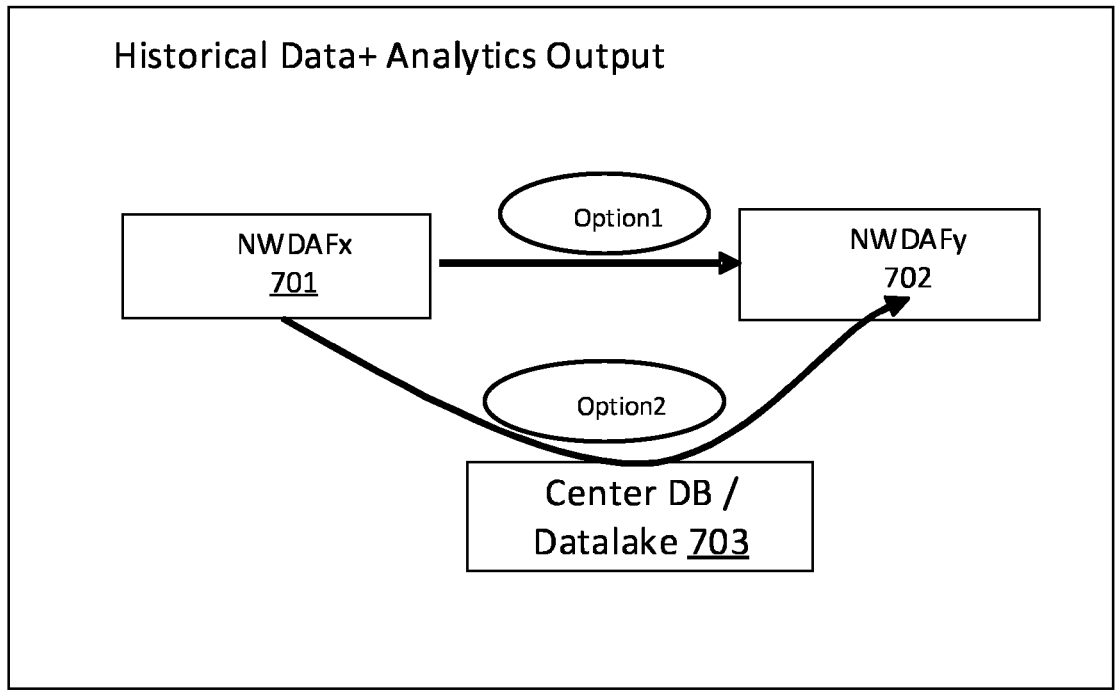
FIG. 7 shows a schematic diagram illustrating historical data transfer according to at least some example embodiments.

FIG. 7 shows a schematic diagram illustrating historical data transfer according to at least some example embodiments.

NWDAFx 701 (e.g. corresponding to NWDAFx 501 of FIG. 5 or NWDAFx 601 of FIG. 6) stores events received by different NFs, e.g. in NWDAF local storage (Option1 in FIG. 7) or Message framework (external DataBase 703) outside of NWDAFx 701 (Option2 in FIG. 7). These stored events are also called historical data. According to at least some example embodiments, Nnwdaf_AnalyticsSusbcription_Susbcribe or Nnwdaf_AnalyticsSusbcription_Handover request has an attribute HistoricalDataExternalDBURI=URI which indicates the address of the events stored. NWDAFy 702 (e.g. corresponding to NWDAFy 502 of FIG. 5 or NWDAFy 602 of FIG. 6) can retrieve the data from Data Base 703 if required based on URI provided by NWDAFx 701.

According to at least some example embodiments, historical data transfer is realized by push API. For example, NWDAFx invokes an API/Service Nnwdaf_HistoricalData_transfer at NWDAFy and provides the historical data details.

3. Analytics Output Data

For example, if analytics calculation is to be performed for 10 hours at NWDAFx (e.g. corresponding to NWDAFx 501 of FIG. 5 or NWDAFx 601 of FIG. 6), and after 5 hours, handover is required from NWDAFx to NWDAFy (e.g. corresponding to NWDAFy 502 of FIG. 5 or NWDAFy 602 of FIG. 6), according to at least some example embodiments, NWDAFx generates output called 'AnalyticsOutput for NWDAF' which will contain the additional information which can be consumed by NWDAFy.

For example, the analytics output data include well-defined metadata which is prepared by first NWDAF (NWDAFx) based on input received until a current time.

According to at least some example embodiments, the analytics output data comprises at least one of an identifier of a storage location of the analytics output data and the analytics output data itself.

According to at least some example embodiments, the analytics output data comprises metadata prepared by the analytics function.

For example, the metadata comprises at least one of the following:

a confidence level, e.g. the confidence level of the analytics calculation done until the current time;
a number of input data analyzed per network function of the network functions;
the number of input data analyzed per network function of the network functions coupled with the confidence level (coupled with confidence level), e.g. the number of events if NWDAF has analyzed NF events per NF (e.g. NWDAFx will tell how many inputs have been analysed per NF);
a prediction result;
a statistics result;
a duration for which the analytics calculation was performed; and
a last analytics report of the analytics calculation, which was sent to a network function consumer by the analytics function and/or a time or other indication of when the last analytics report was done.

For example, the metadata further comprises analytics specific information useful for other NWDAF, e.g. additional analytics calculation results if NWDAFx has performed analytics calculation on the UE. For example, if NWDAFx has performed UE mobility analytics calculation to predict the location of the UE, then that result can be shared with NWDAFy.

Figure 8:
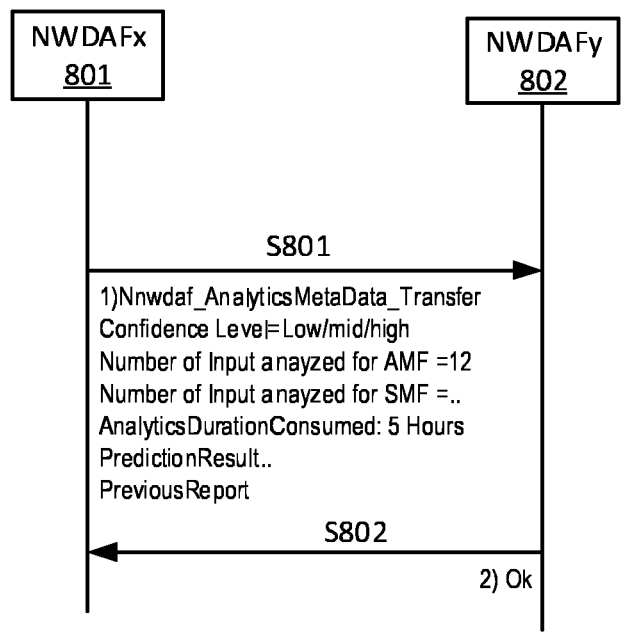
FIG. 8 shows a signaling diagram illustrating analytics output data transfer according to at least some example embodiments.

'Analytics Output for NWDAF' transfer can also be realized by a push mechanism, as illustrated in FIG. 8. For this purpose, in step S801, NWDAFx 801 (e.g. corresponding to NWDAFx 501 of FIG. 5 or NWDAFx 601 of FIG. 6) invokes an API/Service Nnwdaf_AnalyticsMetaData_Transfer provided by NWDAFy (e.g. corresponding to NWDAFy 502 of FIG. 5 or NWDAFy 602 of FIG. 6) and passes the information regarding the analytics output. In the example shown in FIG. 8, this information indicates whether the confidence level is low, middle or high, number of input analyzed for AMF=12, number of input analyzed for SMF= . . . , AnalyticsDurationConsumed: 5 hours, Prediction result, . . . , previous report.

In step S802, the NWDAFy 802 replies with "OK".

Keeping analytics output transfer via separate API as illustrated in FIG. 8 has some merits as it enables NWDAFs to collect/transfer metadata at a later point of time once the handover is done or in progress (in handover preparation phase).

According to at least some example embodiments, the above described analytics output/metadata data is transferred via a dedicated Nnwdaf_Handover service. Alternatively, according to at least some example embodiments, the above described analytics output/metadata data is transferred via any other Nnwdaf service.

Figure 9:
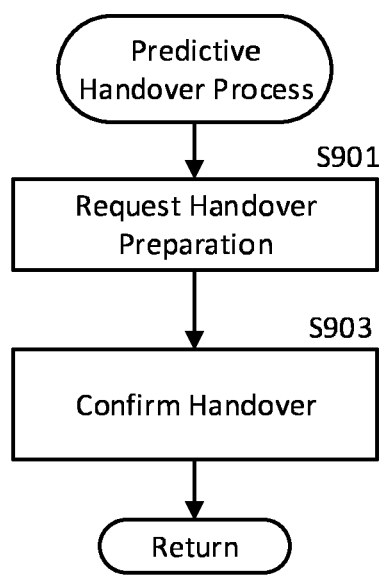
FIG. 9 shows a flowchart illustrating a process of predictive handover according to at least some example embodiments.

FIG. 9 shows a flowchart illustrating a process of predictive handover according to at least some example embodiments. The process is executed by an analytics function or an apparatus for performing an analytics function, e.g. NWDAFx 501 of FIG. 5 or NWDAFx 601 of FIG. 6.

In step S901 of FIG. 9, if a first condition for a handover of an analytics calculation which is performed for a user equipment by the analytics function is met, preparation of the handover of the analytics calculation is requested of at least one other analytics function of the communication network (e.g. NWDAFy 502, NWDAFz 504 in FIG. 5 or NWDAFy 602 in FIG. 6). According to at least some example embodiments, "at least one other analytics function" comprises "one other analytics function". According to at least some example embodiments, "at least one other analytics function" comprises "a plurality of other analytics functions".

For example, the apparatus for performing an analytics function may detect the first condition for a handover of an analytics calculation which is performed for a user equipment by the analytics function.

For example, preparation of the handover is requested in steps S505 and S507 of FIG. 5 and S605 of FIG. 6.

According to at least some example embodiments, performing the analytics calculation for the user equipment is continued by the analytics function.

In step S903, if a second condition for the handover of the analytics calculation is met, the handover to one of the at least one other analytics function is confirmed, the analytics calculation for the user equipment at the analytics function being deemed complete.

For example, upon detecting a second condition for the handover of the analytics calculation, the apparatus for performing an analytics function may consider or determine that the analytics calculation for the user equipment at the analytics function is compete.

Then the process shown in FIG. 9 ends.

According to at least some example embodiments, in case the at least one other analytics function includes a plurality of other analytics functions (e.g. NWDAFy 502, NWDAFz 504 in FIG. 5), if the second condition for the handover of the analytics calculation is met, in step S903, the handover to one (e.g. NWDAFy 502 in FIG. 5) of the plurality of other analytics functions is confirmed, the analytics calculation for the user equipment at the analytics function being deemed complete. In addition, the handover to the remaining ones (e.g. NWDAFz 504 in FIG. 5) of the plurality of other analytics functions is cancelled.

According to at least some example embodiments, when the analytics calculation for the user equipment at the current analytics function (e.g. NWDAFx) is deemed complete, performing the analytics calculation by the current analytics function is stopped.

For example, in step S510 of FIG. 5 and step S608 of FIG. 6 the handover is confirmed to NWDAFy which in this case is the "one of the at least one other analytics functions" or the "one of the plurality of other analytics functions". In addition, in step S511 of FIG. 5 the handover to NWDAFz is cancelled which is a "remaining one of the plurality of other analytics functions".

According to at least some example embodiments, the first condition comprises at least one of the following:
  a prediction that the user equipment will likely move to an area which is not supported by the analytics function,
  a scheduled shutdown of the analytics function, and
  a predicted or start of overload of the analytics function.

According to at least some example embodiments, the second condition comprises at least one of the following:
  the analytics function obtaining a notification that the user equipment has moved to the area which is not supported by the analytics function,
  a given time has elapsed since the preparation of the handover has been requested of the at least one other analytics function,
  the overload of the analytics function has exceeded a predetermined threshold, and
  a pre-defined time for the scheduled shutdown of the analytics function has arrived.

Figure 10:
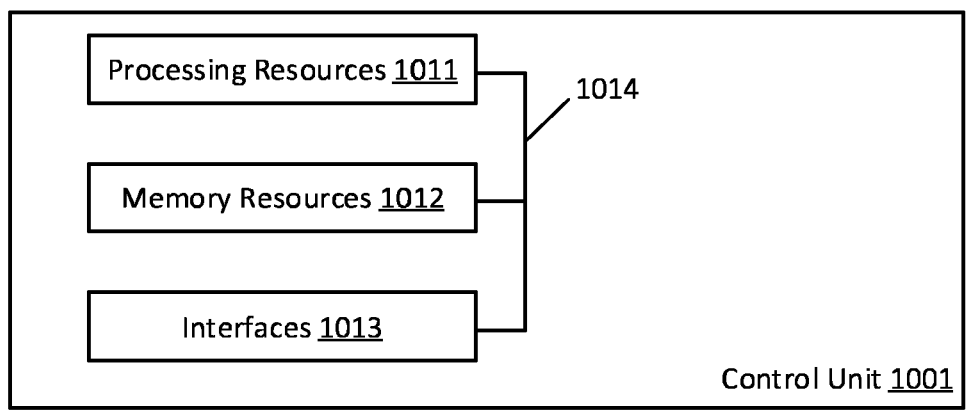
FIG. 10 shows a schematic block diagram illustrating a configuration of a control unit in which at least some example embodiments are implementable.

FIG. 10 shows a schematic block diagram illustrating a configuration of a control unit 1001 in which at least some example embodiments are implementable.

The control unit 1001 comprises processing resources (e.g. processing circuitry) 1011, memory resources (e.g. memory circuitry) 1012 and interfaces (e.g. interface circuitry) 1013, coupled via a connection 1014. The connection 1014 comprises at least one of a wired and wireless connection.

For example, the control unit 1001 implements features of the NWDAFx/NWDAF1, NWDAFy/NWDAF2, NWDAFz/NWDAF3 as described in the above example embodiments. For example, the control unit 1001 implements features of an apparatus for performing functions of the NWDAFx/NWDAF1, NWDAFy/NWDAF2, NWDAFz/NWDAF3 as described in the above example embodiments.

For example, the control unit 1001 is configured to execute the process shown in FIG. 9.

For example, the memory resources 1012 store a program that when executed by the processing resources 1011 cause the control unit 1001 to operate in accordance with the example embodiments as detailed above.

At least some example embodiments are implemented by computer software stored in the memory resources 1012 and executable by the processing resources 1011, or by hardware, or by a combination of software and/or firmware and hardware.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for performing an analytics function of a communication network is provided, the apparatus comprising means for, if a first condition for a handover of an analytics calculation which is performed for a user equipment by the analytics function is met, requesting, of at least one other analytics function of the communication network, preparation of the handover of the analytics calculation, and means for, if a second condition for the handover of the analytics calculation is met, confirming the handover to one of the at least one other analytics function, the analytics calculation for the user equipment at the analytics function being deemed complete.

According to at least some example embodiments, the at least one other analytics function includes a plurality of other analytics functions, and the apparatus comprises means for, if the second condition for the handover of the analytics calculation is met, confirming the handover to one of the plurality of other analytics functions, the analytics calculation for the user equipment at the analytics function being deemed complete, and cancelling the handover to the remaining ones of the plurality of other analytics functions.

According to at least some example embodiments, the apparatus further comprises means for continuing performing the analytics calculation for the user equipment at least until detecting the second condition for the handover.

According to at least some example embodiments, the apparatus further comprises means for transferring, towards the at least one other analytics function, information which relates to the analytics calculation, the information comprising at least one of an indication of handover of the analytics calculation, analytics subscription data, an indication of presence of historical data, historical data, an indication of presence of analytics output data, and analytics output data.

According to at least some example embodiments, the apparatus further comprises means for transferring the information which relates to the analytics calculation in association with requesting the preparation of the handover of the at least one other analytics function.

According to at least some example embodiments, the apparatus further comprises means for transferring the information which relates to the analytics calculation in association with confirming the handover to the one of the at least one other analytics function.

According to at least some example embodiments, the apparatus further comprises means for transferring at least one of the historical data and the analytics output data to the at least one other analytics function using a push communication method.

According to at least some example embodiments, the apparatus further comprises means for periodically performing a prediction on mobility of the user equipment.

According to at least some example embodiments, the apparatus further comprises means for, upon receiving a request to prepare for a handover of another analytics calculation which is performed for a user equipment by another analytics function of the communication network, starting preparing for the other analytics calculation.

According to at least some example embodiments, the means for starting comprises at least one of means for subscribing to network functions of the communication network which are relevant for performing the other analytics calculation for the user equipment, and means for downloading the historical data related with the other analytics calculation.

According to at least some example embodiments, the apparatus further comprises means for, upon receiving a cancellation of the handover, de-subscribing from the network functions relevant for performing the other analytics calculation, and/or means for canceling the downloading of the historical data related with the other analytics calculation.

According to at least some example embodiments, the apparatus further comprises means for, upon receiving a confirmation of the handover, starting notifying an analytics consumer with output of the other analytics calculation.

According to at least some example embodiments, the apparatus further comprises means for acquiring, based on information associated with the other analytics calculation, at least one of historical data and analytics output data associated with the other analytics calculation.

According to at least some example embodiments, the analytics function is a network data analytics function, NWDAF, of a core network complying with a fifth generation, 5G, communication standard.

According to at least some example embodiments, the analytics function calculates analytics based on data collected from different data sources comprising at least one of an access and mobility management function, AMF, session management function, SMF, policy control function, PCF, unified data management, UDM, application function, AF, and operation administration and maintenance (OAM).

According to at least some example embodiments, the analytics function offers analytics identified by a third generation partnership project, 3GPP, defined analytics identifier to consumers using a service based architecture, SBA, defined for the core network complying with the fifth generation, 5G, communication standard.

The scope of protection sought for various example embodiments is set out by the independent claims. Some further aspects are defined in the dependent claims. The example embodiments and features, if any, described in this specification that do not fall under the scope of the independent claims are to be interpreted as examples useful for understanding various example embodiments.

It is to be understood that the above description is illustrative and is not to be construed as limiting the disclosure. Various modifications and applications may occur to those skilled in the art without departing from the true spirit and scope as defined by the appended claims.

The invention claimed is:

1. An apparatus for performing an analytics function of a communication network, the apparatus comprising at least one processor and at least one memory including computer program code, the at least one memory and the computer program code configured to, with the at least one processor, cause the apparatus at least to perform:

determining a first condition for a handover of an analytics calculation for a user equipment by the analytics function is met, wherein the first condition comprises at least one of the following:
a prediction that the user equipment will likely move to an area that is not supported by the analytics function,
a scheduled shutdown of the analytics function, or
a predicted or start of overload of the analytics function;

in response to determining the first condition for the handover is met, transferring, toward at least one other analytics function of the communication network, a subscription request comprising a subscription type that indicates the subscription request is a handover preparation request that requests the at least one other analytics function perform preparation of the handover of the analytics calculation; and if a second condition for the handover of the analytics calculation is met, confirming the handover to one of the at least one other analytics function, the analytics calculation for the user equipment at the analytics function being deemed complete.

2. The apparatus of claim 1, wherein the at least one other analytics function includes a plurality of other analytics functions, and the at least one memory and the computer program code are configured to, with the at least one processor, cause the apparatus to perform:

if the second condition for the handover of the analytics calculation is met,
confirming the handover to one of the plurality of other analytics functions, the analytics calculation for the user equipment at the analytics function being deemed complete, and
cancelling the handover to the remaining ones of the plurality of other analytics functions.

3. The apparatus of claim 1, wherein the second condition comprises at least one of the following:
the apparatus obtaining a notification that the user equipment has moved to the area which is not supported by the analytics function,
a given time has elapsed since the preparation of the handover has been requested of the at least one other analytics function,
the overload of the analytics function has exceeded a predetermined threshold, or a pre-defined time for the scheduled shutdown of the analytics function has arrived.

4. The apparatus of claim 1, wherein the at least one memory and the computer program code are configured to, with the at least one processor, cause the apparatus to further perform:
transferring, towards the at least one other analytics function, information which relates to the analytics calculation, the information comprising at least one of:
analytics subscription data,
an indication of presence of historical data,
historical data,
an indication of presence of analytics output data, or
analytics output data.

5. The apparatus of claim 4, wherein the analytics subscription data comprises at least one of:
a callback uniform resource identifier of a consumer network function which created a subscription at the analytics function, or
an analytics identification and corresponding details comprising at least one of expiry, subscription permanent identifier or analytics specific information.

6. The apparatus of claim 4, wherein
the historical data comprises at least one of an identifier of a storage location of the historical data or the historical data itself, or
the analytics output data comprises at least one of an identifier of a storage location of the analytics output data or the analytics output data itself.

7. The apparatus of claim 4, wherein
the historical data comprises at least one of the following:
events collected by the analytics function;
input data received by the analytics function from network functions of the communication network;
addresses of the network functions;
a time window over which the information has been collected, or
the analytics output data comprises metadata prepared by the analytics function, wherein the metadata comprises at least one of the following:
a confidence level;
a number of input data analyzed per network function of the network functions;
the number of input data analyzed per network function of the network functions coupled with the confidence level;
a prediction result;
a statistics result;
a duration for which the analytics calculation was performed; or
a last analytics report of the analytics calculation, which was sent to a network function consumer by the analytics function and/or a time or other indication of when the last analytics report was done.

8. The apparatus of claim 4, wherein the at least one memory and the computer program code are configured to, with the at least one processor, cause the apparatus to further perform at least one of:
transferring the information which relates to the analytics calculation in association with requesting the preparation of the handover of the at least one other analytics function, or
transferring the information which relates to the analytics calculation in association with confirming the handover to the one of the at least one other analytics function.

9. The apparatus of claim 4, wherein the at least one memory and the computer program code are configured to, with the at least one processor, cause the apparatus to further perform:
transferring at least one of the historical data and the analytics output data to the at least one other analytics function using a push communication method.

10. The apparatus of claim 1, wherein the at least one memory and the computer program code are configured to, with the at least one processor, cause the apparatus to further perform:
requesting the preparation of the handover using at least one of:
a message based on a service-based interface, SBI, or
a service according to a network data analytics function, NWDAF, or confirming the handover using at least one of:
a message based on a service-based interface, SBI, or
a service according to a network data analytics function, NWDAF, or canceling the handover using at least one of:
a message based on a service-based interface, SBI, or
a service according to a network data analytics function, NWDAF.

11. The apparatus of claim 1, wherein the at least one memory and the computer program code are configured to, with the at least one processor, cause the apparatus to further perform:
periodically performing a prediction on mobility of the user equipment.

12. The apparatus of claim 1, wherein the at least one memory and the computer program code are configured to, with the at least one processor, cause the apparatus to further perform:
  upon receiving a request to prepare for a handover of another analytics calculation which is performed for a user equipment by another analytics function of the communication network, starting preparing for the other analytics calculation.

13. The apparatus of claim 12, wherein the starting comprises at least one of:
  subscribing to network functions of the communication network which are relevant for performing the other analytics calculation for the user equipment; or
  downloading the historical data related with the other analytics calculation.

14. The apparatus of claim 13, wherein the at least one memory and the computer program code are configured to, with the at least one processor, cause the apparatus to further perform:
  upon receiving a cancellation of the handover, de-subscribing from the network functions relevant for performing the other analytics calculation; or
  canceling the downloading of the historical data related with the other analytics calculation.

15. The apparatus of claim 12, wherein the at least one memory and the computer program code are configured to, with the at least one processor, cause the apparatus to further perform:
  upon receiving a confirmation of the handover, starting notifying an analytics consumer with output of the other analytics calculation.

16. The apparatus of claim 12, wherein the at least one memory and the computer program code are configured to, with the at least one processor, cause the apparatus to further perform:
  acquiring, based on information associated with the other analytics calculation, at least one of historical data or analytics output data associated with the other analytics calculation.

17. The apparatus of claim 1, wherein
  the analytics function is a network data analytics function, NWDAF, of a core network complying with a fifth generation, 5G, communication standard, and/or
  the analytics function calculates analytics based on data collected from different data sources comprising at least one of an access and mobility management function, AMF, session management function, SMF, policy control function, PCF, unified data management, UDM, application function, AF, or operation administration and maintenance (OAM), or
  the analytics function offers analytics identified by a third generation partnership project, 3GPP, defined analytics identifier to consumers using a service based architecture, SBA, defined for the core network complying with the fifth generation, 5G, communication standard.

18. A method for use by an analytics function of a communication network, the method comprising:
  determining a first condition for a handover of an analytics calculation for a user equipment by the analytics function is met, wherein the first condition comprises at least one of the following:
    a prediction that the user equipment will likely move to an area that is not supported by the analytics function,
    a scheduled shutdown of the analytics function, or
    a predicted or start of overload of the analytics function;
  in response to determining the first condition for the handover is met, transferring, toward at least one other analytics function of the communication network, a subscription request comprising a subscription type that indicates the subscription request is a handover preparation request that requests the at least one other analytics function perform preparation of the handover of the analytics calculation; and
  if a second condition for the handover of the analytics calculation is met, confirming the handover to one of the at least one other analytics function, the analytics calculation for the user equipment at the analytics function being deemed complete.

19. The method of claim 18, wherein the at least one other analytics function includes a plurality of other analytics functions, and wherein the method comprises:
  if the second condition for the handover of the analytics calculation is met,
    confirming the handover to one of the plurality of other analytics functions, the analytics calculation for the user equipment at the analytics function being deemed complete, and
    cancelling the handover to the remaining ones of the plurality of other analytics functions.

20. A non-transitory computer-readable storage medium storing a program, for use by an analytics function of a communication network, and that when executed by a computer causes the computer at least to perform:
  determining a first condition for a handover of an analytics calculation for a user equipment by the analytics function is met, wherein the first condition comprises at least one of the following:
    a prediction that the user equipment will likely move to an area that is not supported by the analytics function,
    a scheduled shutdown of the analytics function, or
    a predicted or start of overload of the analytics function;
  in response to determining the first condition for the handover is met, transferring, toward at least one other analytics function of the communication network, a subscription request comprising a subscription type that indicates the subscription request is a handover preparation request that requests the at least one other analytics function perform preparation of the handover of the analytics calculation; and
  if a second condition for the handover of the analytics calculation is met, confirming the handover to one of the at least one other analytics function, the analytics calculation for the user equipment at the analytics function being deemed complete.

* * * * *

UNITED STATES PATENT AND TRADEMARK OFFICE
CERTIFICATE OF CORRECTION

| | | |
|---|---|---|
| PATENT NO. | : 11,979,783 B2 | Page 1 of 1 |
| APPLICATION NO. | : 17/399399 | |
| DATED | : May 7, 2024 | |
| INVENTOR(S) | : Saurabh Khare et al. | |

It is certified that error appears in the above-identified patent and that said Letters Patent is hereby corrected as shown below:

On the Title Page

In Column 1, below item (65), insert -- (30) Foreign Application Priority Data
Aug. 12, 2020 (WO) ............................ PCT/EP2020/072574 --.

Signed and Sealed this
Eleventh Day of February, 2025

Coke Morgan Stewart
*Acting Director of the United States Patent and Trademark Office*